(12) United States Patent
Nakaya

(10) Patent No.: US 7,426,307 B2
(45) Date of Patent: Sep. 16, 2008

(54) RECORDING MEDIUM HAVING RECORDED THEREON CODED INFORMATION USING PLUS AND/OR MINUS ROUNDING OF IMAGES

(75) Inventor: Yuichiro Nakaya, Suginami-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 11/770,953

(22) Filed: Jun. 29, 2007

(65) Prior Publication Data

US 2008/0013842 A1    Jan. 17, 2008

Related U.S. Application Data

(63) Continuation of application No. 10/623,589, filed on Jul. 22, 2003, now Pat. No. 7,251,369, which is a continuation of application No. 09/513,688, filed on Feb. 25, 2000, now Pat. No. 6,631,214, which is a continuation of application No. 09/093,194, filed on Jun. 8, 1998, now Pat. No. 6,295,376.

(30) Foreign Application Priority Data

Jun. 9, 1997    (JP)    .................................... 9-150656

(51) Int. Cl.
    *G06K 9/32*    (2006.01)
(52) U.S. Cl. ..................................................... 382/238
(58) Field of Classification Search ......... 382/232–253; 375/240.1–240.26; 348/402.1–420.1, 719; 386/50–52, 109; 341/50; 714/800; 708/551
    See application file for complete search history.

(56) References Cited

U.S. PATENT DOCUMENTS 5,054,103 A    10/1991    Yasuda et al.

(Continued)

FOREIGN PATENT DOCUMENTS

| EP | 0712249 | 5/1996 |
|---|---|---|
| EP | 0735769 | 10/1996 |
| EP | 0797357 | 9/1997 |
| JP | 6214754 | 8/1994 |
| JP | 9200763 | 7/1997 |

(Continued)

OTHER PUBLICATIONS

M. Iwashashi, "A Motion Compensation Technique for Down-Scaled Pictures in Layered Coding", IEICE Trans. Commun., vo. E77-B, No. 8, Aug. 1994, pp. 10071012.

(Continued)

*Primary Examiner*—Sherali Ishrat
(74) *Attorney, Agent, or Firm*—Antonelli, Terry, Stout & Kraus, LLP.

(57) ABSTRACT

An image decoding method including the steps of: receiving an encode bitstream including information of I and P frames; and executing motion compensation by synthesizing a predicted image of a current frame using motion vector information included in the encoded bitstream and a reference image which is a previously decoded image, wherein said motion compensation includes calculating intensity values at points where no pixels actually exist in the reference image by interpolation, wherein said interpolation is done according to information specifying a positive rounding method or a negative rounding method included in a header section of the encoded bitstream, when the current frame is a P frame, and wherein information specifying a positive rounding method or a negative rounding method is not included in a header section of the encoded bitstream when the current frame is an I frame.

1 Claim, 13 Drawing Sheets

U.S. PATENT DOCUMENTS

| | | | | |
|---|---|---|---|---|
| 5,481,553 | A | 1/1996 | Suzuki et al. | 375/240.16 |
| 5,486,876 | A | 1/1996 | Lew et al. | 348/719 |
| 5,585,963 | A | 12/1996 | Suzuki | 375/240.04 |
| 5,604,494 | A | 2/1997 | Murakami et al. | 341/50 |
| 5,659,365 | A | 8/1997 | Wilkinson | 375/240.16 |
| 5,737,022 | A | 4/1998 | Yamaguchi et al. | 348/416 |
| 5,740,283 | A | 4/1998 | Meeker | 382/248 |
| 5,905,542 | A | 5/1999 | Linzer | 348/699 |
| 6,008,852 | A | 12/1999 | Nakaya | |
| 6,058,410 | A | 5/2000 | Sharangpani | 708/551 |
| 6,282,243 | B1 | 8/2001 | Kazui et al. | 375/240.16 |
| 6,295,376 | B1 | 9/2001 | Nakaya | 382/236 |
| 2002/0186771 | A1 | 12/2002 | Nakaya et al. | |

FOREIGN PATENT DOCUMENTS

| | | |
|---|---|---|
| JP | 9252470 | 9/1997 |
| JP | 1098729 | 4/1998 |
| JP | 11069345 | 3/1999 |

OTHER PUBLICATIONS

"Video Coding for Low Bit Rate Communication", ITU-T, International Telecommunication Union, Infrastructure of Audiovisual Services-Coding of Moving Video, Feb. 1998.

"Motion-Compensation Prediction Mode and Motion Vector Detection Method", The Journal of the Institute of Television Engineers of Japan, vol. 49, No. 4, Apr. 1995, pp. 445-448.

Y. Nakaya, et al, "Avoindance of Rounding Error Accumulation in Motion Compensation with Half Pel Accuracy", Proceedings of the 1998 IEICE General Conference, D-11-44, Mar. 27-30, 1998, Tokai University, Hiratsuka, Japan.

M. Chatel, "Classical versus Transparent IP Proxies," Network Working Group, Mar. 1999, (web page). http://www.ledtf.org/rfc1919.txt., [Accessed May 9, 2000].

"Nevod Adds Native Support for Multi-player Games including Diabio/Starcraft/Battle.net and Activision/Battlezone to its NAT1000 Internet Sharing Product Line," Nevod, Inc., Press Release, Dec. 14, 1998., http://www.nevod.com/products/nat1000_95.html.

F. Langa ed., "High-speed surfling," Windows Magazine, n 1002, Feb. 1, 1999.

F. Langa ed., "Easy, Low-cost Web Access," Windows Magazine, n. 1006a, Jun. 15, 1999.

"Ositis Software Announces the Launch of WinProxy 3.0, The Complete Internet Sharing Solution", Ositis Software, Press Release, Aug. 10, 1999.

"Windows 2000 Network Address Translator", Microsoft Corporation, Apr. 23, 1999.

"Windows NT Network Address Translator" Microsoft Corporation, Oct. 3, 1998.

K. Egevang et al, "The IP Network Address Translator (NAT)", Network Working Group, May 1994, [web page], http://www.ietf.org/rfc/rfc163.txt., [Accessed Jan. 22, 2000].

RECORDING MEDIUM HAVING RECORDED THEREON CODED INFORMATION USING PLUS AND/OR MINUS ROUNDING OF IMAGES

CROSS REFERENCE TO RELATED APPLICATIONS

This application is a continuation of application Ser. No. 10/623,589, filed Jul. 22, 2003 (now issued as U.S. Pat. No. 7,251,369), which is a continuation of application Ser. No. 09/513,688 filed Feb. 25, 2000 (now U.S. Pat. No. 6,631,214), which is a continuation of application Ser. No. 09/093,194, filed Jun. 8, 1998 (now U.S. Pat. No. 6,295,376), the contents of which are hereby incorporated herein by reference in their entirety.

This application is also related to application Ser. No. 09/514,287, filed Feb. 28, 2000 (now U.S. Pat. No. 6,560,367); application Ser. No. 09/516,207, filed Feb. 29, 2000 (now U.S. Pat. No. 6,529,632); application Ser. No. 09/516,245, filed Mar. 1, 2000 (now U.S. Pat. No. 6,643,409); application Ser. No. 09/875,932, filed Jun. 8, 2001 (now U.S. Pat. No. 6,574,437); application Ser. No. 09/875,930, filed Jun. 8, 2001 (now U.S. Pat. No. 6,650,781); application Ser. No. 09/875,872, filed Jun. 8, 2001 (now U.S. Pat. No. 6,567,558); application Ser. No. 09/875,929, filed Jun. 8, 2001 (now U.S. Pat. No. 6,584,227); application Ser. No. 09/875,928, filed Jun. 8, 2001 (now U.S. Pat. No. 6,606,419); application Ser. No. 10/623,669, filed Jun. 22, 2003 (now U.S. Pat. No. 6,909,809); application Ser. No. 10/623,531, filed Jun. 22, 2003 (now U.S. Pat. No. 6,915,013); application Ser. No. 10/623,668, filed Jun. 22, 2003 (now U.S. Pat. No. 6,868,185); application Ser. No. 10/623,506, filed Jun. 22, 2003 (now U.S. Pat. No. 6,876,769); application Ser. No. 10/902,042, filed Jul. 30, 2004 (now U.S. Pat. No. 7,184,601); application Ser. No. 10/901,959, filed Jul. 30, 2004 (now U.S. Pat. No. 7,200,274); application Ser. No. 10/901,960, filed Jul. 30, 2004); application Ser. No. 10/901,964, filed Jul. 30, 2004 (now U.S. Pat. No. 7,072,518); application Ser. No. 10/902,040, filed Jul. 30, 2004 (now U.S. Pat. No. 7,233,704); application Ser. No. 10/902,041, filed Jul. 30, 2004 (now U.S. Pat. No. 7,236,635), all of which, like the present application, are continuations of application Ser. No. 09/093,194, filed Jun. 8, 1998 (now U.S. Pat. No. 6,295,376). This application relates to and claims priority from Japanese Patent Application No. 9-150656, filed on Jun. 9, 1997. The entirety of the contents and subject matter of all of the above is incorporated herein by reference.

BACKGROUND OF THE INVENTION

1. Field of the Invention

The present invention relates to an image sequence coding and decoding method which performs interframe prediction using quantized values for chrominance or luminance intensity.

2. Related Art

In high efficiency coding of image sequences, interframe prediction (motion compensation) by utilizing the similarity of adjacent frames over time, is known to be a highly effective technique for data compression. Today's most frequently used motion compensation method is block matching with half pixel accuracy, which is used in international standards H.263, MPEG1, and MPEG2. In this method, the image to be coded is segmented into blocks and the horizontal and vertical components of the motion vectors of these blocks are estimated as integral multiples of half the distance between adjacent pixels. This process is described using the following equation:

[Equation 1]

$$P(x,y)=R(x+u_i, y+v_i)(x,y)\in B_i, 0\leq i<N \tag{1}$$

where P(x, y) and R(x, y) denote the sample values (luminance or chrominance intensity) of pixels located at coordinates (x, y) in the predicted image P of the current frame and the reference image (decoded image of a frame which has been encoded before the current frame) R, respectively. "x" and "y" are integers, and it is assumed that all the pixels are located at points where the coordinate values are integers. Additionally it is assumed that the sample values of the pixels are quantized to non-negative integers. N, Bi, and (ui, vi) denote the number of blocks in the image, the set of pixels included in the i-th block of the image, and the motion vectors of the i-th block, respectively.

When the values for "ui" and "vi" are not integers, it is necessary to find the intensity value at the point where no pixels actually exist in the reference image. Currently, bilinear interpolation using the adjacent four pixels is the most frequently used method for this process. This interpolation method is described using the following equation:

[Equation 2]

$$R\left(x+\frac{p}{d}, y+\frac{q}{d}\right) = (d-q)((d-p)R(x,y)+pR(x+1,y))+ \tag{2}$$
$$q((d-p)R(x,y+1)+pR(x+1,y+1)) // d^2$$

where "d" is a positive integer, and "p" and "q" are smaller than "d" but not smaller than zero "0". "//" denotes integer division which rounds the result of normal division (division using real numbers) to the nearest integer.

An example of the structure of an H.263 video encoder is shown in FIG. 1. As the coding algorithm, H.263 adopts a hybrid coding method (adaptive interframe/intraframe coding method) which is a combination of block matching and DCT (discrete cosine transform). A subtractor 102 calculates the difference between the input image (current frame base image) 101 and the output image 113 (related later) of the interframe/intraframe coding selector 119, and then outputs an error image 103. This error image is quantized in a quantizer 105 after being converted into DCT coefficients in a DCT converter 104 and then forms quantized DCT coefficients 106. These quantized DCT coefficients are transmitted through the communication channel, while at the same time used to synthesize the interframe predicted image in the encoder.

The procedure for synthesizing the predicted image is explained next. The above mentioned quantized DCT coefficients 106 forms the reconstructed error image 110 (same as the reconstructed error image on the receive side) after passing through a dequantizer 108 and inverse DCT converter 109. This reconstructed error image and the output image 113 of the interframe/intraframe coding selector 119 is added at the adder 111 and the decoded image 112 of the current frame (same image as the decoded image of current frame reconstructed on the receiver side) is obtained. This image is stored in a frame memory 114 and delayed for a time equal to the frame interval. Accordingly, at the current point, the frame memory 114 outputs the decoded image 115 of the previous frame. This decoded image of the previous frame and the original image 101 of the current frame are input to the block matching section 116 and block matching is performed between these images. In the block matching process, the original image of the current frame is segmented into multiple blocks, and the predicted image 117 of the current frame is synthesized by extracting the section most resembling these blocks from the decoded image of the previous frame. In this process, it is necessary to estimate the motion between the prior frame and the current frame for each block. The motion vector for each block estimated in the motion estimation process is transmitted to the receiver side as motion vector data 120.

On the receiver side, the same prediction image as on the transmitter side is synthesized using the motion vector information and the decoding image of the previous frame. The prediction image 117 is input along with a "0" signal 118 to the interframe/intraframe coding selector 119. This switch 119 selects interframe coding or intraframe coding by selecting either of these inputs. Interframe coding is performed when the prediction image 117 is selected (this case is shown in FIG. 2). On the other hand when the "0" signal is selected, intraframe coding is performed since the input image itself is converted, to a DCT coefficients and output to the communication channel.

In order for the receiver side to correctly reconstruct the coded image, the receiver must be informed whether intraframe coding or interframe coding was performed on the transmitter side. Consequently, an identifier flag 121 is output to the communication circuit. Finally, an H.263 coded bitstream 123 is acquired by multiplexing the quantized DCT coefficients, motion vectors, the and interframe/intraframe identifier flag information in a multiplexer 122.

The structure of a decoder 200 for receiving the coded bit stream output from the encoder of FIG. 1 is shown in FIG. 2. The H.263 coded bit stream 217 that is received is demultiplexed into quantized DCT coefficients 201, motion vector data 202, and an interframe/intraframe identifier flag 203 in the demultiplexer 216. The quantized DCT coefficients 201 become a decoded error image 206 after being processed by an inverse quantizer 204 and inverse DCT converter 205. This decoded error image is added to the output image 215 of the interframe/intraframe coding selector 214 in an adder 207 and the sum of these images is output as the decoded image 208. The output of the interframe/intraframe coding selector is switched according to the interframe/intraframe identifier flag 203. A prediction image 212 utilized when performing interframe encoding is synthesized in the prediction image synthesizer 211. In this synthesizer, the position of the blocks in the decoded image 210 of the prior frame stored in frame memory 209 is shifted according to the motion vector data 202. On the other hand, for intraframe coding, the interframe/intraframe coding selector outputs the "0" signal 213 as is.

SUMMARY OF THE INVENTION

The image encoded by H.263 is comprised of a luminance plane ("Y" plane) containing luminance information, and two chrominance planes ("U" plane and "V" plane) containing chrominance information.

At this time, characteristically, when the image has 2m pixels in the horizontal direction and 2n pixels in the vertical direction ("m" and "n" are positive integers), the Y plane has 2m pixels horizontally and 2n pixels vertically, the U and V planes have m pixels horizontally and n pixels vertically.

The low resolution on the chrominance plane is due to the fact that the human visual system has a comparatively dull visual faculty with respect to spatial variations in chrominance. Having such image as an input, H.263 performs coding and decoding in block units referred to as macroblocks.

The structure of a macroblock is shown in FIG. 3. The macroblock is comprised of three blocks; a Y block, U block and V block. The size of the Y block 301 containing the luminance information is 16×16 pixels, and the size of the U block 302 and V block 303 containing the chrominance information is 8×8 pixels.

In H.263, half pixel accuracy block matching is applied to each block. Accordingly, when the estimated motion vector is defined as (u, v), u and v are both integral multiples of half the distance between pixels. In other words, ½ is used as the minimum unit. The configuration of the interpolation method used for the intensity values (hereafter the intensity values for "luminance" and "chrominance" are called by the general term "intensity value") is shown in FIG. 4. When performing the interpolation described in equation 2, the quotients of division are rounded off to the nearest integer, and further, when the quotient has a half integer value (i.e. 0.5 added to an integer), rounding off is performed to the next integer in the direction away from zero. In other words, in FIG. 4, when the intensity values for 401, 402, 403, 404 are respectively La, Lb, Lc, and Ld (La, Lb, Lc, and Ld are non-negative integers), the interpolated intensity values Ia, Ib, Ic, and Id (Ia, Ib, Ic, and Id are non-negative integers) at positions 405, 406, 407, 408 are expressed by the following equation:

[Equation 3]

$$Ia = Ib$$

$$Ib = [(La+Lb+1)/2]$$

$$Ic = [(La+Lc+1)/2]$$

$$Id = [(La+Lb+Lc+Ld+2)/4] \quad (3)$$

where "[ ]" denotes truncation to the nearest integer towards zero "0" (i.e. the fractional part is discarded). The expectation of the errors caused by this rounding to integers is estimated as follows: It is assumed that the probability that the intensity value at positions 405, 406, 407, and 408 of FIG. 4 is used is all 25 percent. When finding the intensity value Ia for position 405, the rounding error will clearly be zero "0". Also, when finding the intensity value Ib for position 406, the error will be zero "0" when La+Lb is an even number, and when an odd number the error is ½. If the probability that La+Lb will be an even number and an odd number is both 50 percent, then the expectation for the error will be 0×½+½× ½=¼. Further, when finding the intensity value Ic for position 407, the expectation for the error is ¼ as for Ib. When finding the intensity value Id for position 408, the error when the residual of La+Lb+Lc+Ld divided by four are 0, 1, 2, and 3 are respectively 0, −¼, ½, and ¼.

If we assume that the probability that the residual is 0, 1, 2, and 3 is all equal (i.e. 25 percent), the expectation for the error is 0×¼−¼×¼+½×¼+¼×¼=⅛. As described above, assuming that the possibility that the intensity value at positions 405-408 being used are all equal, the final expectation for the error is 0×¼+¼×¼+¼×¼+⅛×¼=5/32. This indicates that each time motion compensation is performed by means of block matching, an error of 5/32 occurs in the pixel intensity value. Generally in low rate coding, sufficient number of bits cannot be used for the encoding of the interframe error difference so that the quantized step size of the DCT coefficient is prone to be large. Accordingly, errors occurring due to motion compensation are corrected only when it is very large. When interframe encoding is performed continuously without performing intraframe coding under such environment, the errors tend to accumulate and cause bad effects on the reconstructed image.

Just as explained above, the number of pixels is about half (½) in both the vertical and horizontal direction on the chrominance plane. Therefore, for the motion vectors of the U block and V block, half (½) the value of the motion vector for the Y block is used for the vertical and horizontal components. Since the horizontal and vertical components of the motion vector for the Y block motion vector are integral multiples of ½, the motion vector components for the U and V blocks will appear as integral multiples of ¼ (quarter pixel accuracy) if ordinary division is implemented. However, due to the high computational complexity of the intensity interpolation process for motion vectors with quarter ¼ pixel accuracy, the motion vectors for U and V blocks are rounded to half ½ pixel accuracy in H.263.

The rounding method utilized in H.263 is as follows: According to the definition described above, (u, v) denotes the motion vector of the macroblock (which is equal to the motion vector for the Y block). Assuming that r is an integer and s is a non-negative integer smaller than 4, u/2 can be rewritten as u/2=r+s/4. When s is 0 or 2, no rounding is required since u/2 is already an integral multiple of ½. However when s is equal to 1 or 3, the value of s is rounded to 2. By increasing the possibility that s takes the value of 2 using this rounding method, the filtering effect of motion compensation can be emphasized. When the probability that the value of s prior to rounding is 0, 1, 2, and 3 are all percent, the probability that s will be 0 or 2 after rounding will respectively be 25 percent and 75 percent. The above explained process related to the horizontal component u of the motion vector is also applied to the vertical component v. Accordingly, in the U block and V block, the probability for using the intensity value of the 401 position is ¼×¼=¹⁄₁₆, and the probability for using the intensity value of the 402 and 403 positions is both ¼×¾=³⁄₁₆, while the probability for using the intensity value of position 404 is ¾×¾=⁹⁄₁₆. By utilizing the same method as above, the expectation for the error of the intensity value is 0×¹⁄₁₆+¼×³⁄₁₆+¼×³⁄₁₆+⅛×⁹⁄₁₆=²¹⁄₁₂₈.

Just as explained above for the Y block, when interframe encoding is continuously performed, the problem of accumulated errors occurs. As related above, for image sequence coding and decoding methods in which interframe prediction is performed and luminance or chrominance intensity is quantized, the problem of accumulated rounding errors occurs. This rounding error is generated when the luminance or chrominance intensity value is quantized during the generation of the interframe prediction image.

In view of the above problems, it is therefore an object of this invention, to improve the quality of the reconstructed image by preventing error accumulation.

In order to achieve the above object, the accumulation of errors is prevented by limiting the occurrence of errors or performing an operation to cancel out errors that have occurred.

DETAILED DESCRIPTION OF THE PREFERRED EMBODIMENTS

Figure 5:
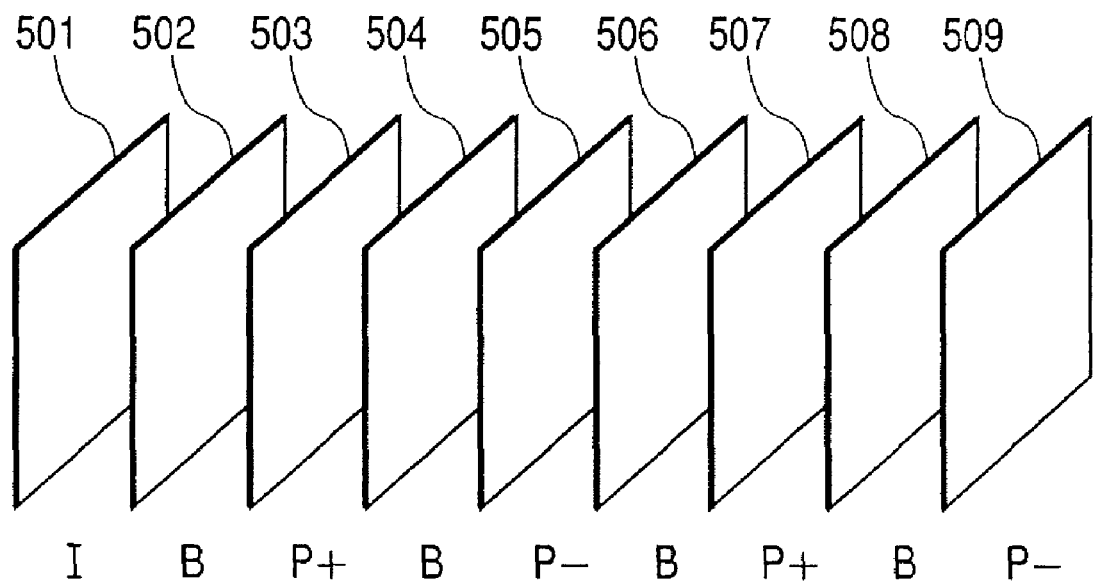
FIG. 5 is a drawing showing a coded image sequence.

First, in which circumstances the accumulated rounding errors as described in the "Related Art" occur must be considered. An example of an image sequences encoded by coding methods which can perform both unidirectional prediction and bidirectional prediction such as in MPEG.1, MPEG.2 and H.263 is shown in FIG. 5.

An image 501 is a frame-coded by means of intraframe coding and is referred to as an I frame. In contrast, images 503, 505, 507, 509 are called P frames and are coded by unidirectional interframe coding by using the previous I or P frame as the reference image. Accordingly, when for instance encoding image 505, image 503 is used as the reference image and interframe prediction is performed. Images 502, 504, 506 and 508 are called B frames and bidirectional interframe prediction is performed utilizing the previous and subsequent I or P frame. The B frame is characterized by not being used as a reference image when interframe prediction is performed. Since motion compensation is not performed in I frames, the rounding error caused by motion compensation will not occur. In contrast, not only is motion compensation performed in the P frames but the P frame is also used as a reference image by other P or B frames so that it may be a cause leading to accumulated rounding errors. In the B frames on the other hand, motion compensation is performed so that the effect of accumulated rounding errors appears in the reconstructed image. However, due to the fact that B frames are not used as reference images, B frames cannot be a source of accumulated rounding errors. Thus, if accumulated rounding errors can be prevented in the P frame, then the bad effects of rounding errors can be alleviated in the overall image sequence. In H.263 a frame for coding a P frame and a B frame exists and is called a PB frame (For instance, frames 503 and 504 can both be encoded as a PB frame). If the combined two frames are viewed as separate frames, then the same principle as above can be applied. In other words, if countermeasures are taken versus rounding errors for the P frame part within a PB frame, then the accumulation of errors can be prevented.

Rounding errors occur during interpolation of intensity values when a value obtained from normal division (division whose operation result is a real number) is a half ($\frac{1}{2}$) integer (0.5 added to an integer) and this result is then rounded up to the next integer in the direction away from zero. For instance, when dividing by 4 to find an interpolated intensity value is performed, the rounding errors for the cases when the residual is 1 and 3 have equal absolute values but different signs. Consequently, the rounding errors caused by these two cases are canceled when the expectation for the rounding errors is calculated (in more general words, when dividing by a positive integer d' is performed, the rounding errors caused by the cases when the residual is t and d' −t are cancelled). However, when the residual is 2, in other words when the result of normal division is a half integer, the rounding error cannot be canceled and leads to accumulated errors.

To solve this problem, a method that allows the usage of two rounding methods can be used. The two rounding methods used here are: a rounding method that rounds half ($\frac{1}{2}$) integers away from zero (0); and a rounding method that rounds half ($\frac{1}{2}$) integers towards zero (0). By combining the usage of these two rounding methods, the rounding errors can be canceled. Hereafter, the rounding method that rounds the result of normal division to the nearest integer and rounds half integer values away from 0 is called "positive rounding". Additionally, the rounding method that rounds the result of normal division to the nearest integer and rounds half ($\frac{1}{2}$) integer values towards zero (0) is called "negative rounding". The process of positive rounding used in block matching with half ($\frac{1}{2}$) pixel accuracy is shown in Equation 3. When negative rounding is used instead, this equation can be rewritten as shown below.

[Equation 4]

$$Ia = Ib$$

$$Ib = [(La+Lb)/2]$$

$$Ic = [(La+Lc)/2]$$

$$Id = [(La+Lb+Lc+Ld+1)/4] \quad (4)$$

Hereafter motion compensation methods that performs positive and negative rounding for the synthesis of interframe prediction images are called "motion compensation using positive rounding" and "motion compensation using negative rounding", respectively. Furthermore, for P frames which use block matching with half ($\frac{1}{2}$) pixel accuracy for motion compensation, a frame that uses positive rounding is called a "P+ frame" and a frame that uses negative rounding is called a "P− frame" (under this definition, the P frames in H.263 are all P+ frames). The expectation for the rounding errors in P+ and P− frames have equal absolute values but different signs. Accordingly, the accumulation of rounding errors can be prevented when P+ frames and P− frames are alternately located along the time axis.

In the example in FIG. 5, if the frames 503 and 507 are set as P+ frames and the frames 505 and 509 are set as P− frames, then this method can be implemented. The alternate occurrence of P+ frames and P− frames leads to the usage of a P+ frame and a P− frame in the bidirectional prediction for B frames. Generally, the average of the forward prediction image (i.e. the prediction image synthesized by using frame 503 when frame 504 in FIG. 5 is being encoded) and the backward prediction image (i.e. the prediction image synthesized by using frame 505 when frame 504 in FIG. 5 is being encoded) is frequently used for synthesizing the prediction image for B frames. This means that using a P+ frame (which has a positive value for the expectation of the rounding error) and a P− frame (which has a negative value for the expectation of the rounding error) in bidirectional prediction for a B frame is effective in canceling out the effects of rounding errors. Just as related above, the rounding process in the B frame will not be a cause of error accumulation. Accordingly, no problem will occur even if the same rounding method is applied to all the B frames. For instance, no serious degradation of decoded images is caused even if motion compensation using positive rounding is performed for all of the B frames 502, 504, 506, and 508 in FIG. 5. Preferably only one type of rounding is performed for a B frame, in order to simplify the B frame decoding process.

Figure 16:
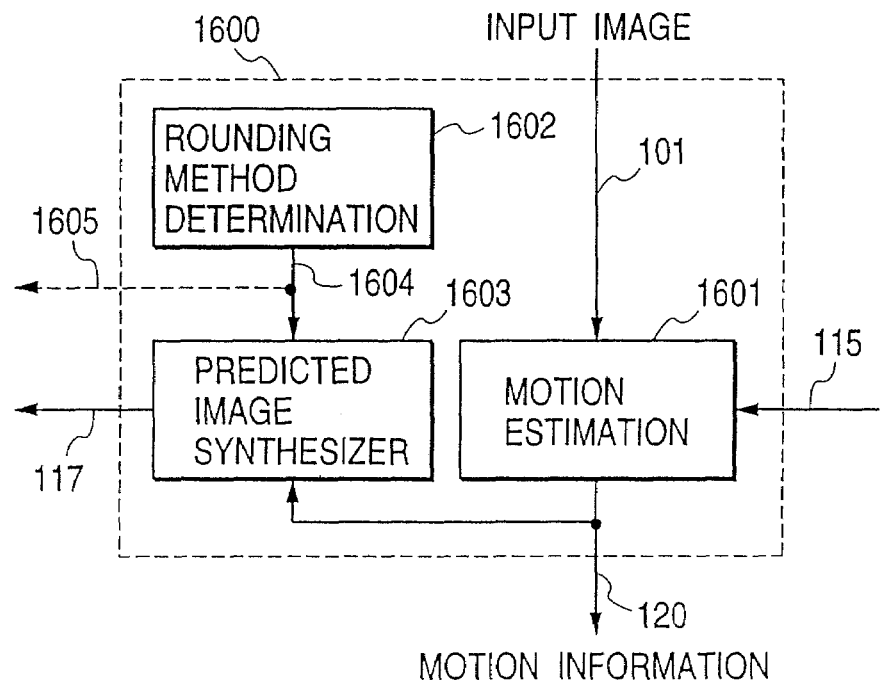
FIG. 16 is a block diagram showing an example of a block matching unit included in a device using an encoding method where P+ and P− frames coexist.

A block matching section 1600 of an image encoder according to the above described motion compensation method utilizing multiple rounding methods is shown in FIG. 16. Numbers identical to those in other drawings indicate the same part. By substituting the block matching section 116 of FIG. 1 with 1600, multiple rounding methods can be used. Motion estimation processing between the input image 101 and the decoded image of the previous frame is performed in a motion estimator 1601. As a result, motion information 120 is output. This motion information is utilized in the synthesis of the prediction image in a prediction image synthesizer 1603.

A rounding method determination device 1602 determines whether to use positive rounding or negative rounding as the rounding method for the frame currently being encoded. Information 1604 relating to the rounding method that was determined is input to the prediction image synthesizer 1603. In this prediction image synthesizer 1603, a prediction image 117 is synthesized and output based on the rounding method determined by means of information 1604. In the block matching section 116 in FIG. 1, there are no items equivalent to 1602, 1604 of FIG. 16, and the prediction image is synthesized only by positive rounding. Also, the rounding method 1605 determined at the block matching section can be output, and this information can then be multiplexed into the bit stream and be transmitted.

Figure 17:
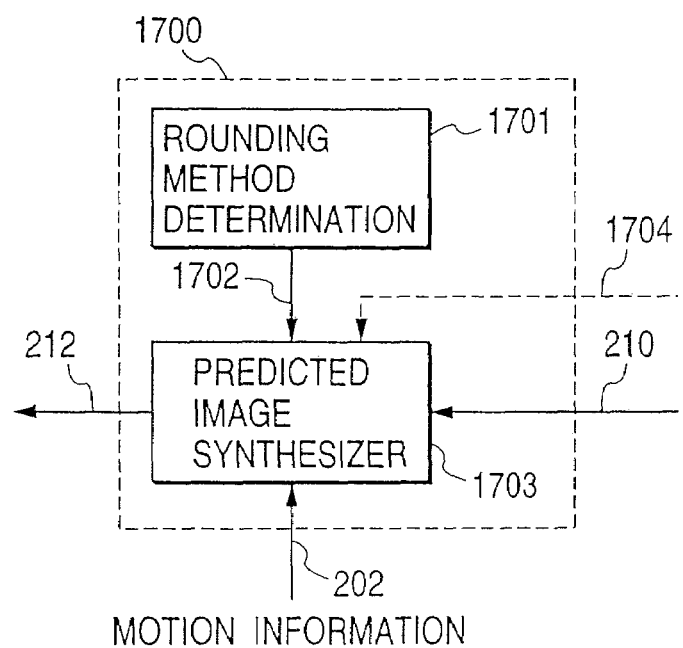
FIG. 17 is a block diagram showing the prediction image synthesizer included in a device for decoding bit streams encoded by an encoding method where P+ and P− frames coexist.

A prediction image synthesizer 1700 of an image decoder which can decode bit streams generated by a coding method using multiple rounding methods is shown in FIG. 17. Numbers identical to those in other drawings indicate the same part. By substituting the prediction image synthesizer 211 of FIG. 2 by 1700, multiple rounding methods can be used. In the rounding method determination device 1701, the rounding method appropriate for prediction image synthesis in the decoding process is determined. In order to carry out decoding correctly, the rounding method selected here must be the same as the rounding method that was selected for encoding.

For instance the following rule can be shared between the encoder and decoder: When the current frame is a P frame and the number of P frames (including the current frame) counted from the most recent I frame is odd, then the current frame is a P+ frame. When this number is even, then the current frame is a P− frame. If the rounding method determination device on the encoding side (For instance, 1602 in FIG. 16) and the rounding method determination device 1701 conform to this common rule, then the images can correctly be decoded. The prediction image is synthesized in the prediction image synthesizer 1703 using motion information 202, decoding image 210 of the prior frame, and information 1702 related to the rounding method determined as just described. This prediction image 212 is output and then used for the synthesis of the decoded image.

As an alternative to the above mentioned case, a case where the information related to the rounding method is multiplexed in the transmitted bit stream can also be considered (such bit stream can be generated at the encoder by outputting the information 1605 related to the rounding method from the block matching section depicted in FIG. 16). In such case, the rounding method determiner device 1701 is not used, and information 1704 related to the rounding method extracted from the encoded bit stream is used at the prediction image synthesizer 1703.

Figure 1:
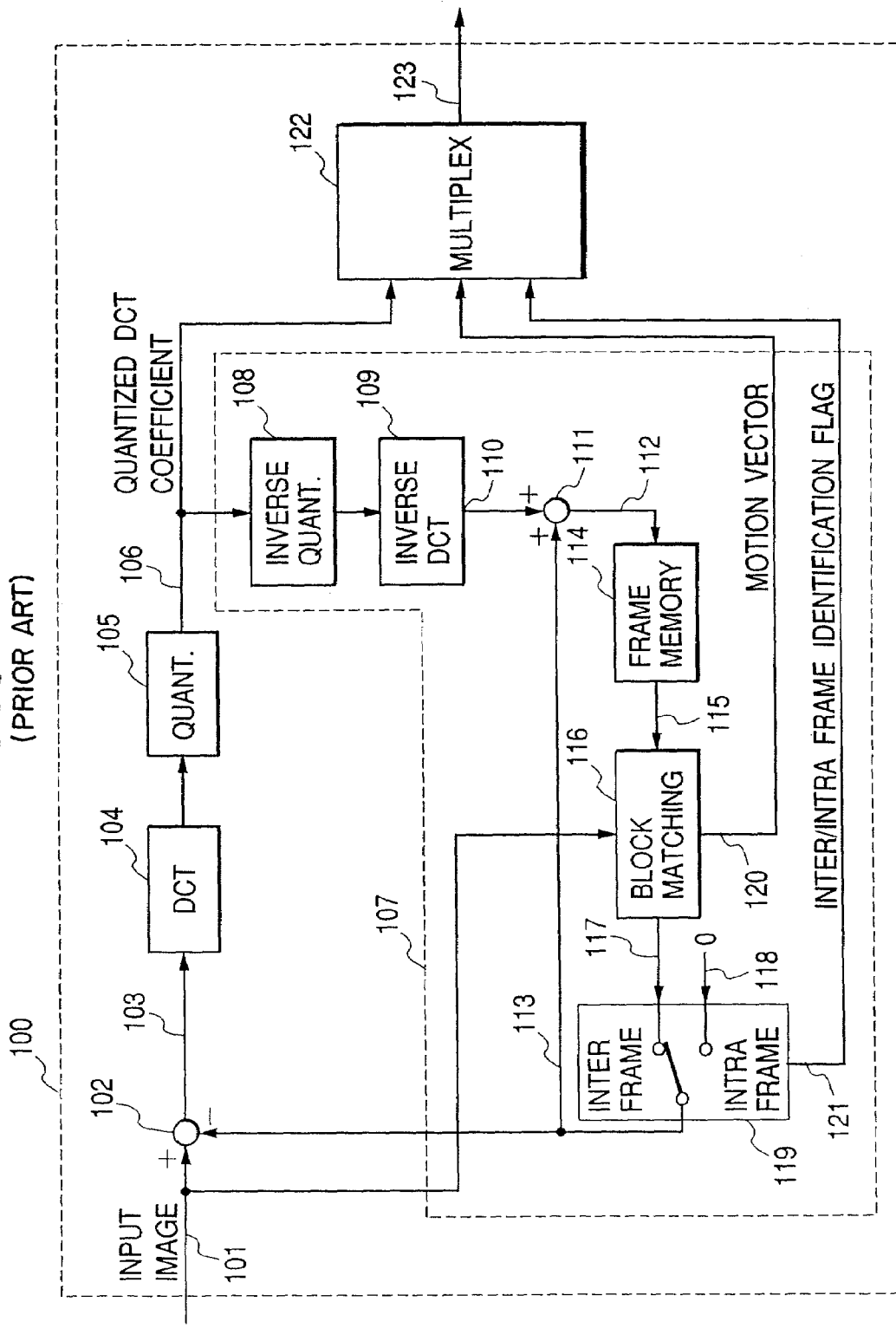
FIG. 1 is a block diagram showing the layout of the H.263 image encoder.
Figure 2:
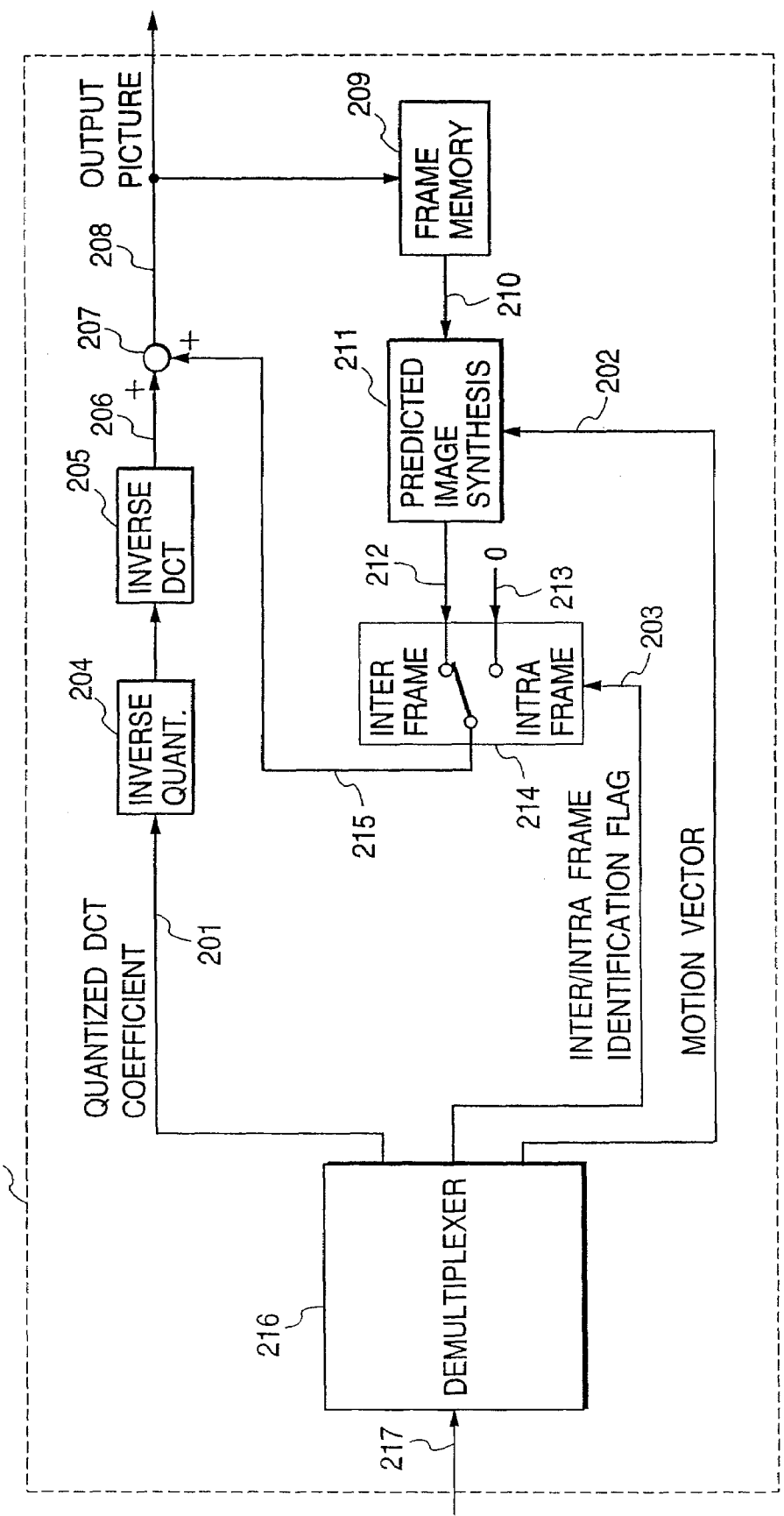
FIG. 2 is a block diagram showing the layout of the H.263 image decoder.
Figure 3:
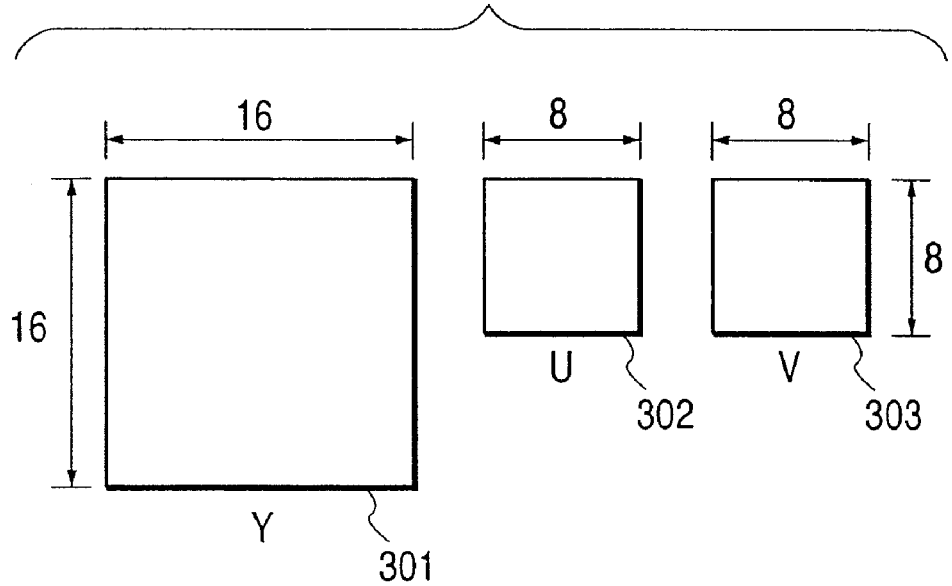
FIG. 3 is a drawing showing the structure of the macro block.
Figure 6:
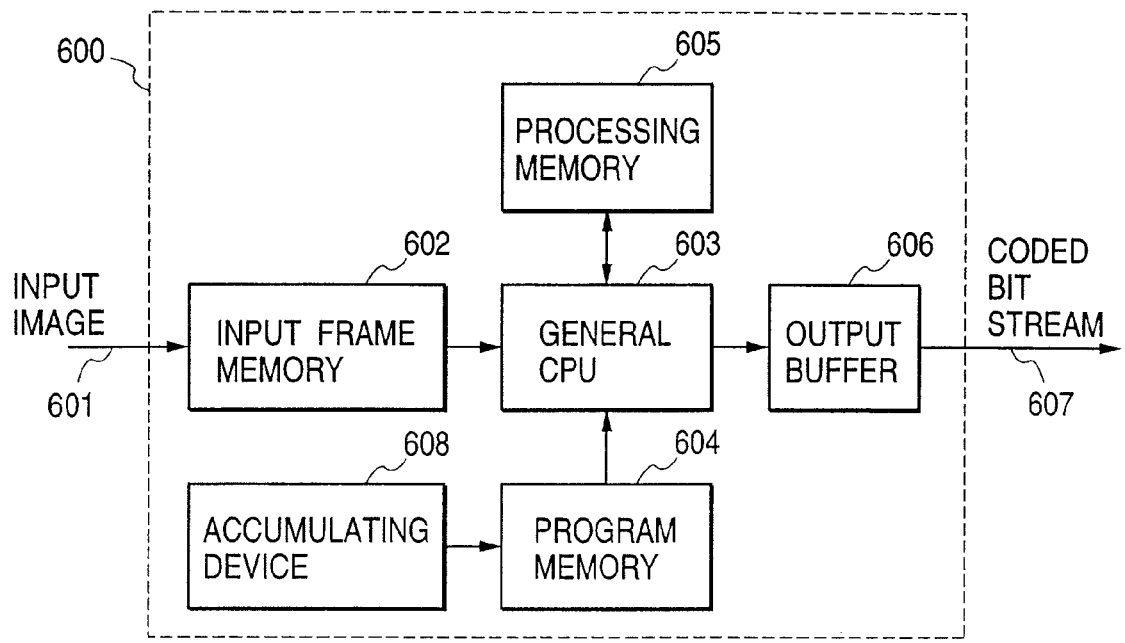
FIG. 6 is a block diagram showing a software image encoding device.
Figure 7:
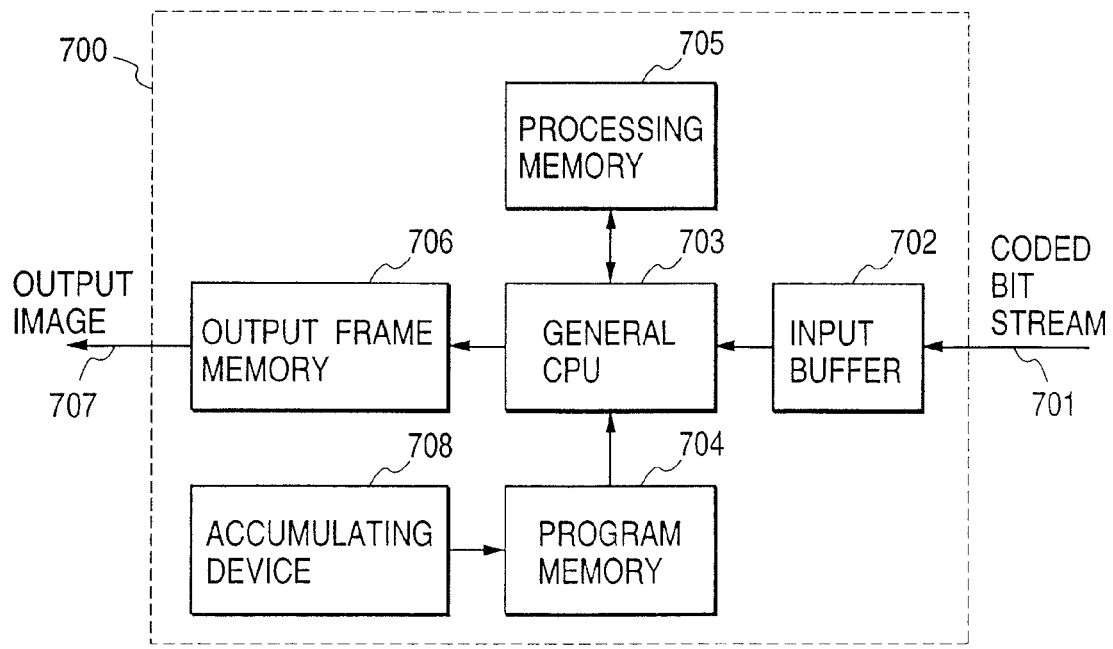
FIG. 7 is a block diagram showing a software image decoding device.

Besides the image encoder and the image decoder utilizing the custom circuits and custom chips of the conventional art as shown in FIG. 1 and FIG. 2, this invention can also be applied to software image encoders and software image decoders utilizing general-purpose processors. A software image encoder 600 and a software image decoder 700 are shown in FIG. 6 and FIG. 7. In the software image encoder 600, an input image 601 is first stored in the input frame memory 602 and the general-purpose processor 603 loads information from here and performs encoding. The program for driving this general-purpose processor is loaded from a storage device 608 which can be a hard disk, floppy disk, etc. and stored in a program memory 604. This general purpose processor also uses a process memory 605 to perform the encoding. The encoding information output by the general-purpose processor is temporarily stored in the output buffer 606 and then output as an encoded bit stream 607.

Figure 8:
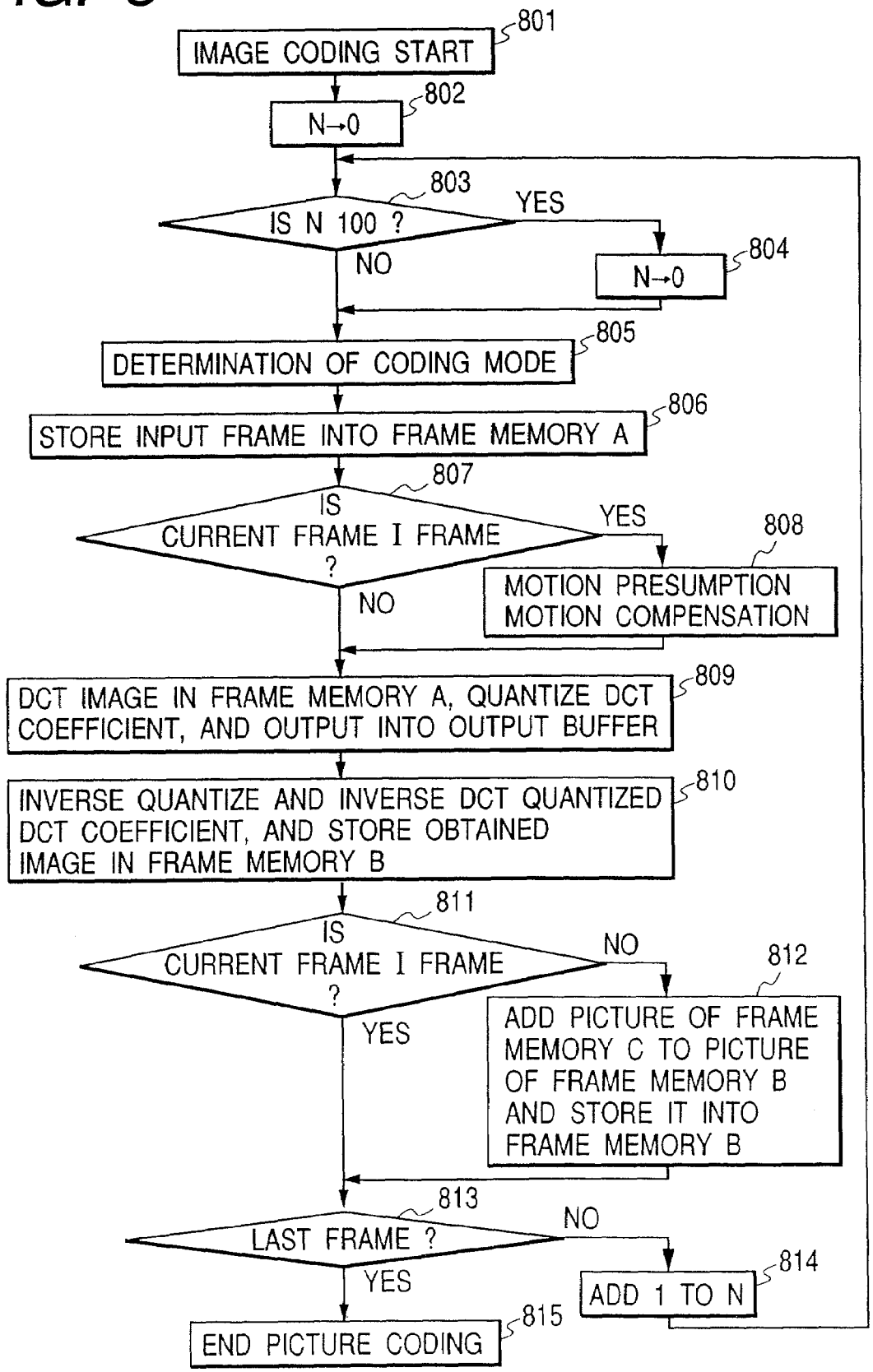
FIG. 8 is a flow chart showing an example of processing in the software image encoding device.

A flowchart for the encoding software (recording medium readable by computer) is shown in FIG. 8. The process starts in 801, and the value 0 is assigned to variable N in 802. Next, in 803 and 804, the value 0 is assigned to N when the value for N is 100. N is a counter for the number of frames. 1 is added for each one frame whose processing is complete, and values from 0 to 99 are allowed when performing coding. When the value for N is 0, the current frame is an I frame. When N is an odd number, the current frame is a P+ frame, and when an even number other than 0, the current frame is a P− frame. When the upper limit for the value of N is 99, it means that one I frame is coded after 99 P frames (P+ frames or P− frames) are coded. By always inserting one I frame in a certain number of coded frames, the following benefits can be obtained: (a) Error accumulation due to a mismatch between encoder and decoder processing can be prevented (for instance, a mismatch in the computation of DCT); and (b) The processing load for acquiring the reproduced image of the target frame from the coded data (random access) is reduced. The optimal N value varies when the encoder performance or the environment where the encoder is used are changed. It does not mean, therefore, that the value of N must always be 100.

Figure 9:
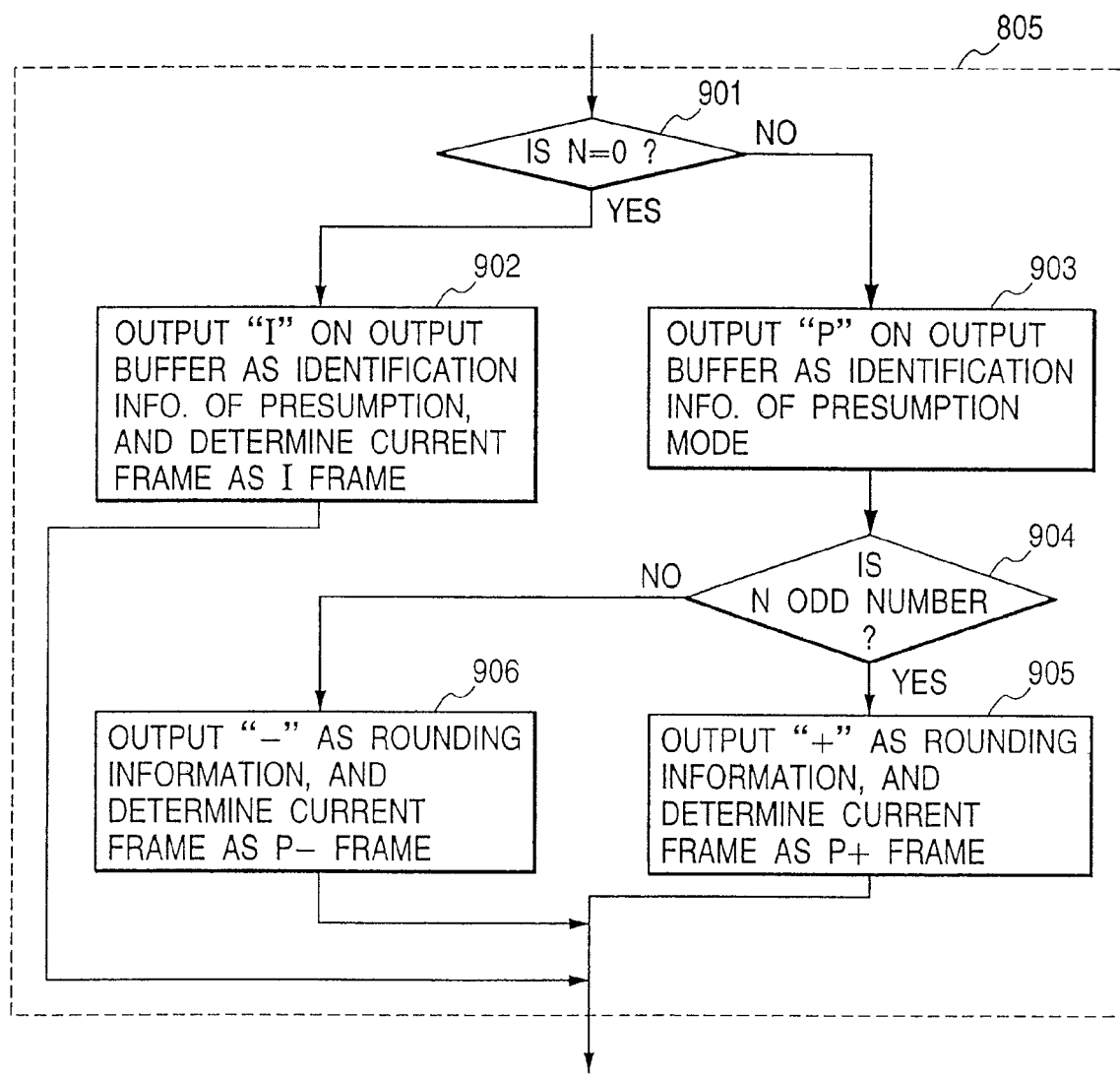
FIG. 9 is a flow chart showing an example of the coding mode decision processing for the software image encoding device.

The process for determining the rounding method and coding mode for each frame is performed in 805 and the flowchart with details of this operation is shown in FIG. 9. First of all, whether N is a zero (0) or not is checked in 901. If N is 0, then 'I' is output as distinction information of the prediction mode, to the output buffer in 902. This means that the image to be coded is will be coded as an I frame. Here, "output to the output buffer" means that after being stored in the output buffer, the information is output to an external device as a portion of the coded bit stream. When N is not 0, then whether N is an odd or even number is identified in 904. When N is an odd number, '+' is output to the output buffer as the distinction information for the rounding method in 905, and the image to be coded will be coded as a P+ frame. On the other hand, when N is an even number, '−' is output to the output buffer as the distinction information for the rounding method in 906, and the image to be coded will be coded as a P− frame.

The process again returns to FIG. 8, where after determining the coding mode in 805, the input image is stored in the frame memory A in 806. The frame memory A referred to here signifies a portion of the memory zone (for instance, the memory zone maintained in the memory of 605 in FIG. 6) of the software encoder. In 807, it is checked whether the frame currently being coded is an I frame. When not identified as an I frame, motion estimation and motion compensation is performed in 808.

Figure 10:
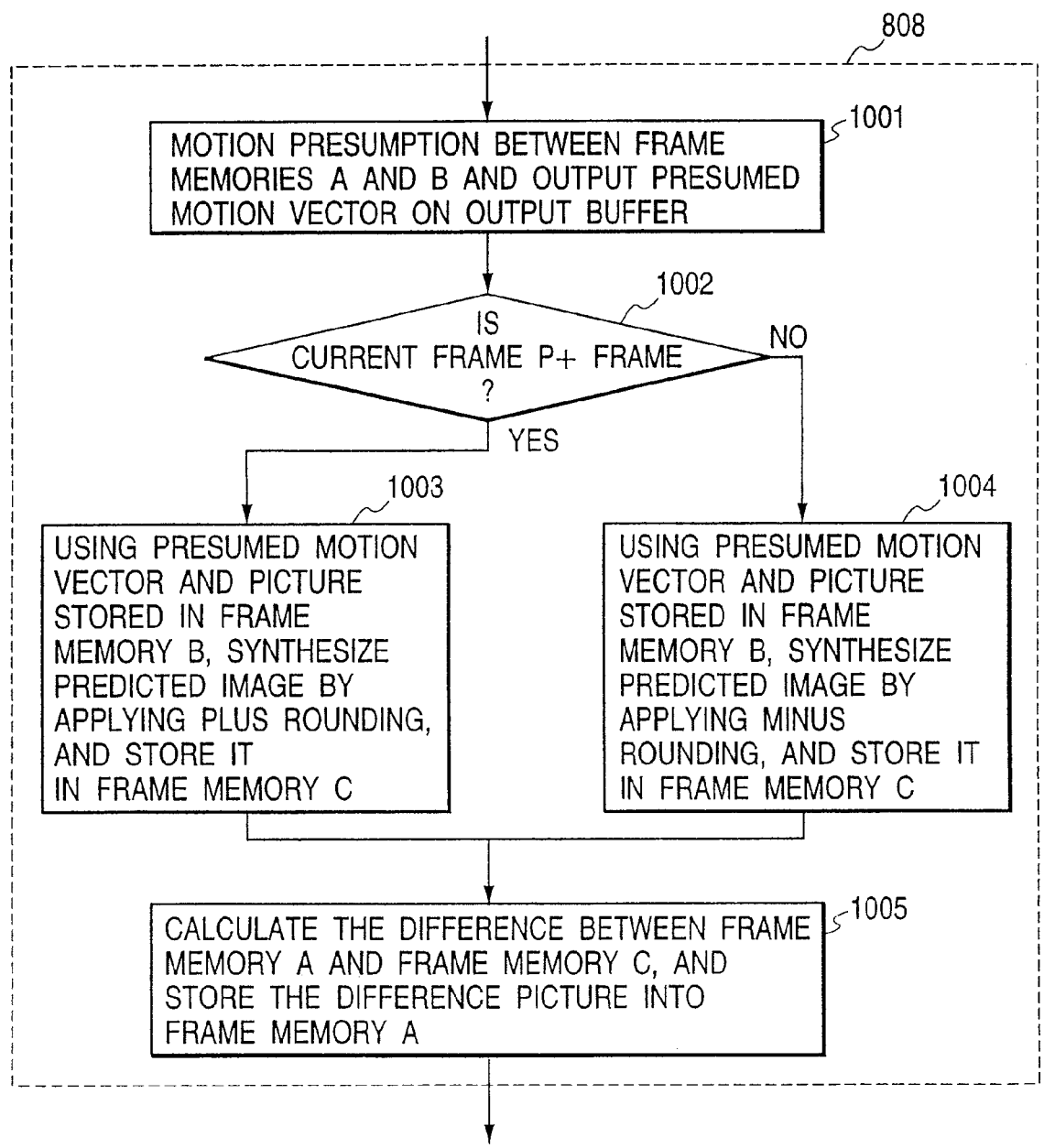
FIG. 10 is a flow chart showing an example of motion estimation and motion compensation processing in the software image encoding device.

The flowchart in FIG. 10 shows details of this process performed in 808. First of all, in 1001, motion estimation is performed between the images stored in frame memories A and B (just as written in the final part of this paragraph, the decoded image of the prior frame is stored in frame memory B). The motion vector for each block is found, and this motion vector is sent to the output buffer. Next, in 1002, whether or not the current frame is a P+ frame is checked. When the current frame is a P+ frame, the prediction image is synthesized in 1003 utilizing positive rounding and this prediction image is stored in frame memory C. On the other hand, when the current frame is a P− frame, the prediction image is synthesized in 1004 utilizing negative rounding and this prediction image is stored in the frame memory C. Next, in 1005, the differential image between frame memories A and C is found and stored in frame memory A.

Here, the process again returns to FIG. 8. Prior to starting the processing in 809, the input image is stored in frame memory A when the current frame is an I frame, and the differential image between the input image and the prediction image is stored in frame memory A when the current frame is a P frame (P+ or P− frame). In 809, DCT is applied to the image stored in frame memory A, and the DCT coefficients calculated here are sent to the output buffer after being quantized. In 810, inverse quantization is performed to the quantized DCT coefficients and inverse DCT is applied. The image obtained by applying inverse DCT is stored in frame memory B. Next in 811, it is checked again whether the current frame is an I frame. When the current frame is not an I frame, the images stored in frame memory B and C are added and the result is stored in frame memory B. The coding process of a frame ends here, and the image stored in frame memory B before going into 813 is the reconstructed image of this frame (this image is identical with the one obtained at the decoding side). In 813, it is checked whether the frame whose coding has just finished is the final frame in the sequence. If this is true, the coding process ends. If this frame is not the final frame, 1 is added to N in 814, and the process again returns to 803 and the coding process for the next frame starts.

A software decoder 700 is shown in FIG. 7. After the coded bit stream 701 is temporarily stored in the input buffer 702, this bit stream is then loaded into the general-purpose processor 703. The program for driving this general-purpose processor is loaded from a storage device 708 which can be a hard disk, floppy disk, etc. and stored in a program memory 704. This general-purpose processor also uses a process memory 605 to perform the decoding. The decoded image obtained by the decoding process is temporarily stored in the output frame memory 706 and then sent out as the output image 707.

Figure 11:
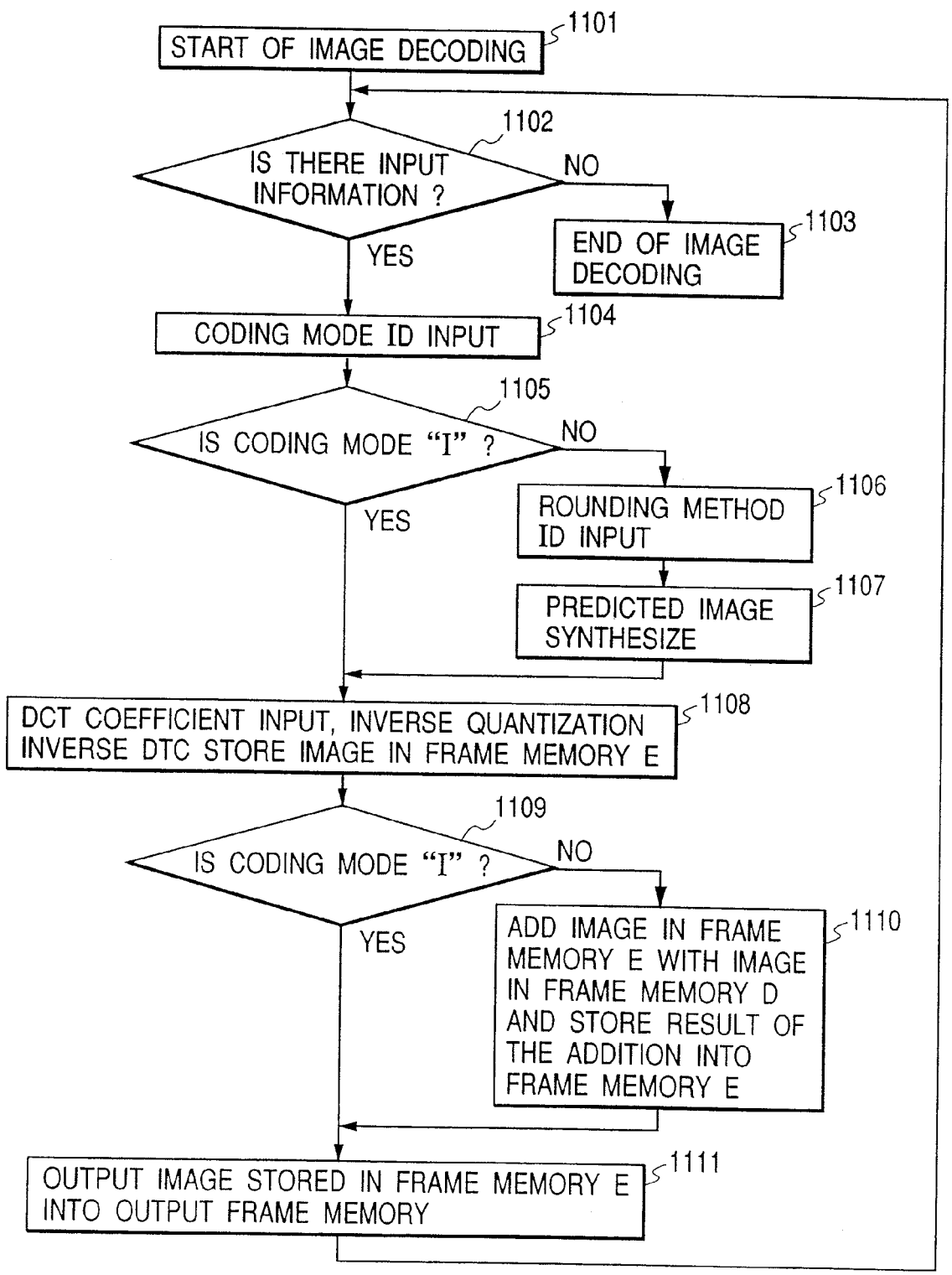
FIG. 11 is a flow chart showing the processing in the software image decoding device.

A flowchart of the decoding software for the software decoder 700 shown in FIG. 7 is shown in FIG. 11. The process starts in 1101, and it is checked in 1102 whether input information is present. If there is no input information, the decoding process ends in 1103. When input information is present, distinction information of the prediction mode is input in 1104. The word "input" used here means that the information stored in the input buffer (for instance 702 of FIG. 7) is loaded by the general-purpose processor. In 1105, it is checked whether the encoding mode distinction information is "I". When not "I", the distinction information for the rounding method is input and synthesis of the interframe prediction image is performed in 1107.

Figure 12:
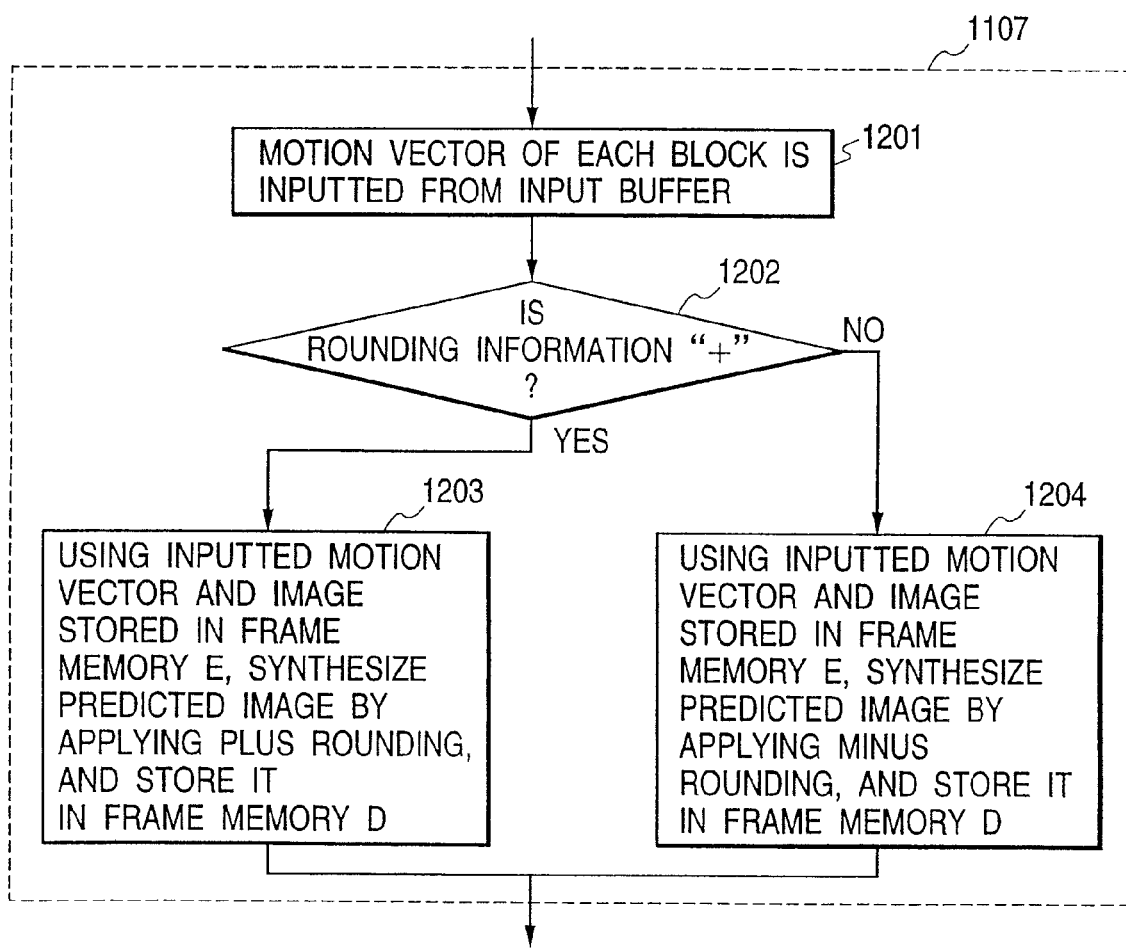
FIG. 12 is a flow chart showing an example of motion compensation processing in the software image decoding device.

A flowchart showing details of the operation in 1107 is shown in FIG. 12. In 1201, a motion vector is input for each block. Then, in 1202, it is checked whether the distinction information for the rounding method loaded in 1106 is a "+". When this information is "+", the frame currently being decoded is a P+ frame. In this case, the prediction image is synthesized using positive rounding in 1203, and the prediction image is stored in frame memory D. Here, frame memory D signifies a portion of the memory zone of the software decoder (for instance, this memory zone is obtained in the processing memory 705 in FIG. 7). When the distinction information of the rounding method is not "+", the current frame being decoded is a P− frame. The prediction image is synthesized using negative rounding in 1204 and this prediction image is stored in frame memory D. At this point, if a P+ frame is decoded as a P− frame due to some type of error, or conversely if a P− frame is decoded as a P+ frame, the correct prediction image is not synthesized in the decoder and the quality of the decoded image deteriorates.

After synthesizing the prediction image, the operation returns to FIG. 11 and the quantized DCT coefficients is input in 1108. Inverse quantization and inverse DCT is then applied to these coefficients and the resulting image is stored in frame memory E. In 1109, it is checked again whether the frame currently being decoded is an I frame. If the current frame is not an I frame, images stored in frame memory D and E are added in 1110 and the resulting sum image is stored in frame memory E. The image stored in frame memory E before starting the process in 1111 is the reconstructed image. This image stored in frame memory E is output to the output frame memory (for instance, 706 in FIG. 7) in 1111, and then output from the decoder as the reconstructed image. The decoding process for a frame is completed here and the process for the next frame starts by returning to 1102.

When a software based on the flowchart shown in FIGS. 8-12 is run in the software image encoders or decoders, the same effect as when custom circuits and custom chips are utilized are obtained.

Figure 13:
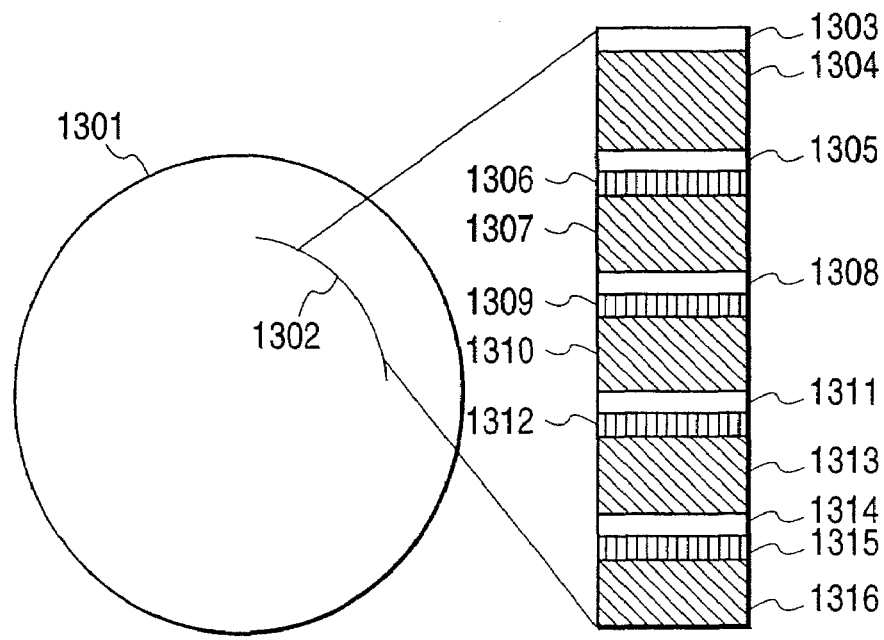
FIG. 13 is a drawing showing an example of a storage media on which an encoded bit stream generated by an encoding method that outputs bit streams including I, P+ and P− frames is recorded.

A storage media (recording media) with the bit stream generated by the software encoder 601 of FIG. 6 being recorded is shown in FIG. 13. It is assumed that the algorithms shown in the flowcharts of FIGS. 8-10 is used in the software encoder. Digital information is recorded concentrically on a recording disk 1301 capable of recording digital information (for instance magnetic disks, optical disk, etc.). A portion 1302 of the information recorded on this digital disk includes: prediction mode distinction information 1303, 1305, 1308, 1311, and 1314; rounding method distinction information 1306, 1309, 1312, and 1315; and motion vector and DCT coefficient information 1304, 1307, 1310, 1313, and 1316. Information representing 'I' is recorded in 1303, 'P' is recorded in 1305, 1308, 1311, and 1314, '+' is recorded in 1306, and 1312, and '−' is recorded in 1309, and 1315. In this case, 'I' and '+' can be represented by a single bit of zero (0), and 'P' and '−' can be represented by a single bit of one (1). Using this representation, the decoder can correctly interpret the recorded information and the correct reconstructed image is synthesized. By storing a coded bit stream in a storage media using the method described above, the accumulation of rounding errors is prevented when the bit stream is read and decoded.

Figure 15:
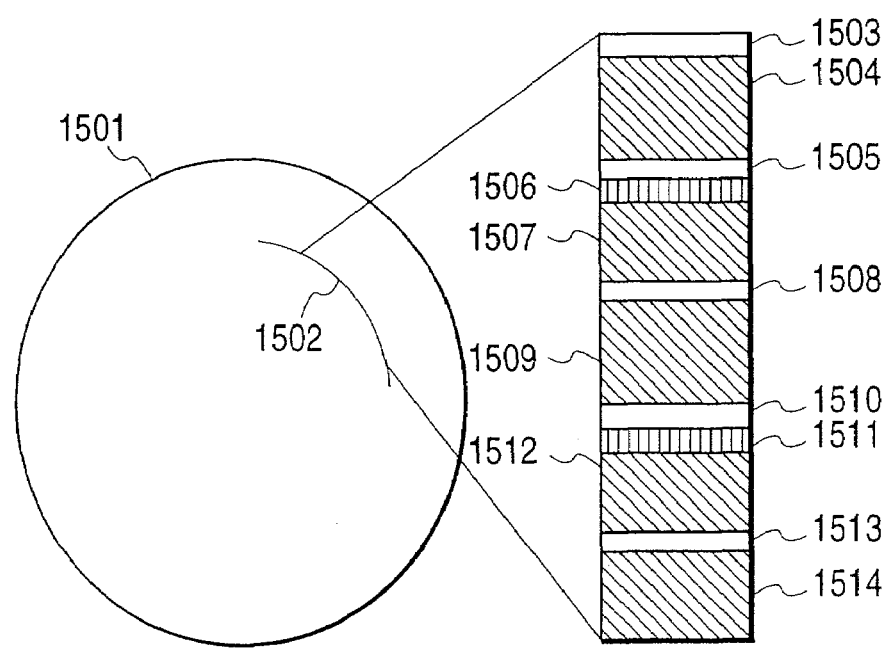
FIG. 15 is a drawing showing an example of a storage media on which an encoded bit stream generated by an encoding method the outputs bit streams including I, B, P+, and P− frames is recorded.

A storage media with the bit stream of the coded data of the image sequence shown in FIG. 5 being recorded is shown in FIG. 15. The recorded bit stream includes information related to P+, P−, and B frames. In the same way as in 1301 of FIG. 13, digital information is recorded concentrically on a record disk 1501 capable for recording digital information (for instance, magnetic disks, optical disks, etc.). A portion 1502 of the digital information recorded on this digital disk includes: prediction mode distinction information 1503, 1505, 1508, 1510, and 1513; rounding method distinction information 1506, and 1512; and motion vector and DCT coefficient information 1504, 1507, 1509, 1511, and 1514. Information representing 'I' is recorded in 1503, 'P' is recorded in 1505, and 1510, 'B' is recorded in 1508, and 1513, '+' is recorded in 1505, and '−' is recorded in 1511. In this case, 'I', 'P' and 'B' can be represented respectively by two bit values 00, 01, and 10, and '+' and is '−' can be represented respectively by one bit values 0 and 1. Using this representation, the decoder can correctly interpret the recorded information and the correct reconstructed is synthesized.

In FIG. 15, information related to frame 501 (I frame) in FIG. 5 is 1503 and 1504, information related to 502 (B frame) is 1508 and 1509, information related to frame 503 (P+ frame) is 1505 and 1507, information related to frame 504 (B frame) is 1513 and 1514, and information related to frame 505 (P− frame) is 1510 and 1512. When coding image sequences are coded using B frames, the transmission order and display order of frames are usually different. This is because the previous and subsequent reference images need to be coded before the prediction image for the B frame is synthesized. Consequently, in spite of the fact that the frame 502 is displayed before frame 503, information related to frame 503 is transmitted before information related to frame 502.

As described above, there is no need to use multiple rounding methods for B frames since motion compensation in B frames do not cause accumulation of rounding errors. Therefore, as shown in this example, information that specifies rounding methods (e.g. '+' and '−') is not transmitted for B frames. Thus for instance, even if only positive rounding is applied to B frames, the problem of accumulated rounding errors does not occur. By storing coded bit streams containing information related to B frames in a storage media in the way described above, the occurrence of accumulated rounding errors can be prevented when this bit stream is read and decoded.

Figure 14:
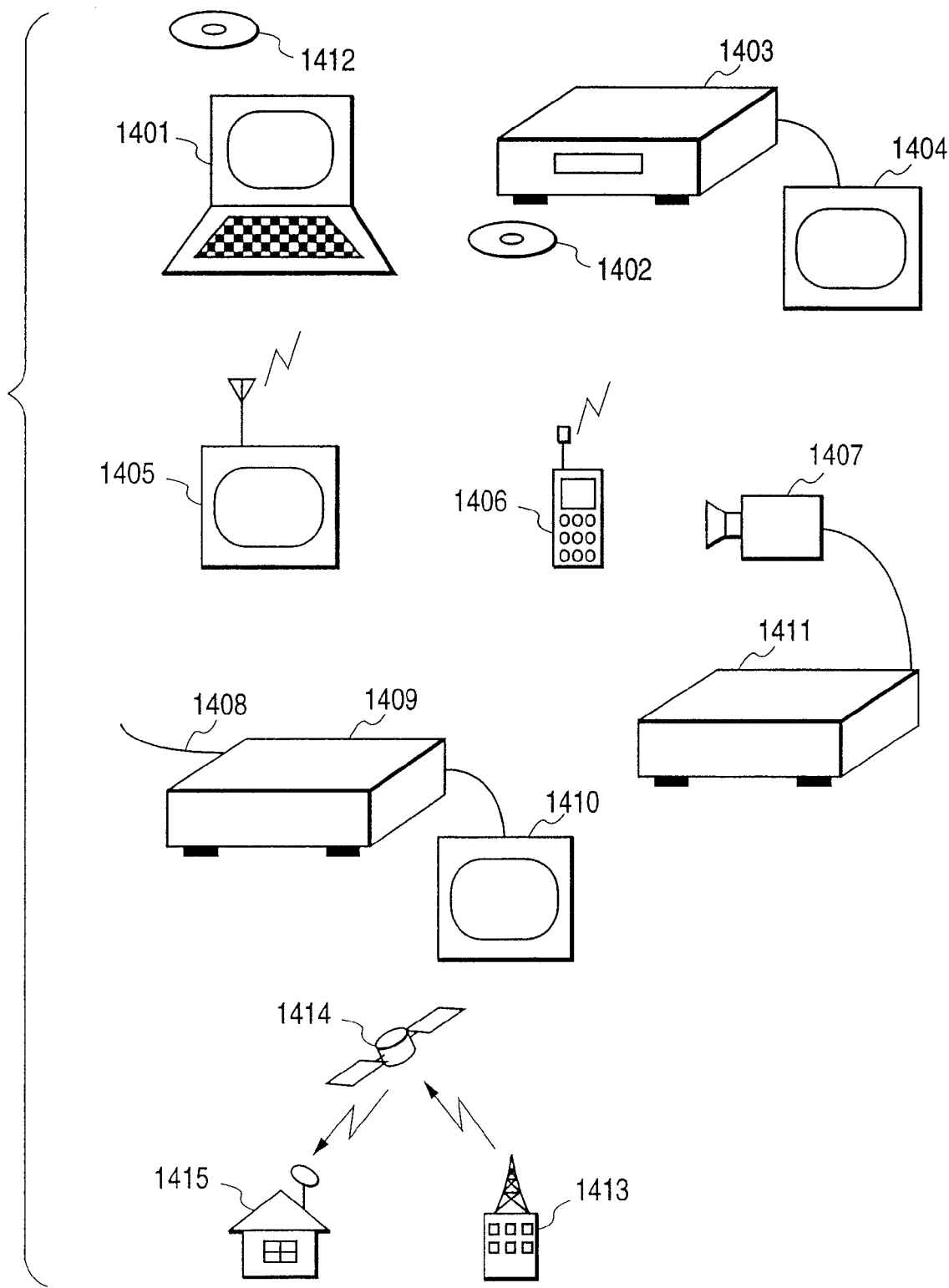
FIG. 14 is a set of drawings showing specific examples of devices using an encoding method where P+ and P− frames coexist.

Specific examples of coders and decoders using the coding method described in this specification is shown in FIG. 14. The image coding and decoding method can be utilized by installing image coding and decoding software into a computer 1401. This software is recorded in some kind of storage media (CD-ROM, floppy disk, hard disk, etc.) 1412, loaded into a computer and then used. Additionally, the computer can be used as an image communication terminal by connecting the computer to a communication lines. It is also possible to install the decoding method described in this specification into a player device 1403 that reads and decodes the coded bit stream recorded in a storage media 1402. In this case, the reconstructed image signal can be displayed on a television monitor 1404. The device 1403 can be used only for reading the coded bit stream, and in this case, the decoding device can be installed in the television monitor 1404. It is well known that digital data transmission can be realized using satellites and terrestrial waves. A decoding device can also be installed in a television receiver 1405 capable of receiving such digital transmissions. Also, a decoding device can also be installed inside a set top box 1409 connected to a satellite/terrestrial wave antenna, or a cable 1408 of a cable television system, so that the reconstructed images can be displayed on a television monitor 1410. In this case, the decoding device can be incorporated in the television monitor rather than in the set top box, as in the case of 1404. The layout of a digital satellite broadcast system is shown in 1413, 1414 and 1415. The video information in the coded bit stream is transmitted from a broadcast station 1413 to a communication or broadcast satellite 1414. The satellite receives this information, sends it to a home 1415 having equipment for receiving satellite broadcast programs, and the video information is reconstructed and displayed in this home using devices such as a television receiver or a set top box.

Digital image communication using mobile terminals 1406 has recently attracted considerable attention, due to the fact that image communication at very low bit rates has become possible. Digital portable terminals can be categorized in the following three types: a transceiver having both an encoder and decoder; a transmitter having only an encoder; and a receiver having only a decoder.

An encoding device can be installed in a video camera recorder 1407. The camera can also be used just for capturing the video signal and this signal can be supplied to a custom encoder 1411. All of the devices or systems shown in this drawing can be equipped with the coding and/or decoding method described in this specification. By using this coding and/or decoding method in these devices or systems, images of higher quality compared with those images obtained using conventional technologies can be obtained. The following variations are clearly included within the scope of this invention.

(i) A prerequisite of the above described principle was the use of block matching as a motion compensation method. However, this invention is further capable of being applied to all image sequence coding and decoding methods in which motion compensation is performed by taking a value for the vertical and horizontal components of the pixel motion vector that is other than an integer multiple of the sampling period in the vertical and horizontal directions of the pixel, and then finding by interpolation, the intensity value of a position where the sample value is not present. Thus for instance, the global motion compensation listed in Japanese Patent Application No. 8-60572 published as Japanese Patent Application Laid-Open No. 9-252470 and the warping prediction listed in Japanese Patent Application No. 8-249601 published as Japanese Patent Application Laid-Open No. 10-98729 are applicable to the method of this invention.

(ii) The description of the invention only mentioned the case where a value integral multiple of ½ was taken for the horizontal and vertical components of the motion vector. However, this invention is also generally applicable to methods in which integral multiples of 1/d (d is a positive integer and also an even number) are allowed for the horizontal and vertical components of the motion vector. However, when d becomes large, the divisor for division in bilinear interpolation (square of "d", see Equation 2) also becomes large, so that in contrast, the probability of results from normal division reaching a value of 0.5 become low. Accordingly, when performing only positive rounding, the absolute value of the expectation for rounding errors becomes small and the bad effects caused by accumulated errors become less conspicuous. Also applicable to the method of this invention, is a motion compensation method where for instance, the d value is variable, both positive rounding and negative rounding are used when d is smaller than a fixed value, and only positive rounding or only negative rounding is used when the value of d is larger than a fixed value.

(iii) As mentioned in the "Related Art" section, when DCT is utilized as an error coding method, the adverse effects from accumulated rounding errors are prone to appear when the quantized step size of the DCT coefficient is large. However a method is also applicable to the invention, in which, when the quantization step size of DCT coefficients is larger than a threshold value then both positive rounding and negative rounding are used. When the quantization step size of the DCT coefficients is smaller than the threshold value then only positive rounding or only negative rounding is used.

(iv) In cases where error accumulations occur on the luminance plane and cases where error accumulations occur on the chrominance plane, the bad effects on the reconstructed images are generally more serious in the case of error accumulations on the chrominance plane. This is due to the fact that rather than cases where the image darkens or lightens slightly, cases where overall changes in the image color happen are more conspicuous. However, a method is also applicable to this invention in which both positive rounding and negative rounding are used for the chrominance signal, and only positive rounding or negative rounding is used for the luminance signal.

Figure 4:
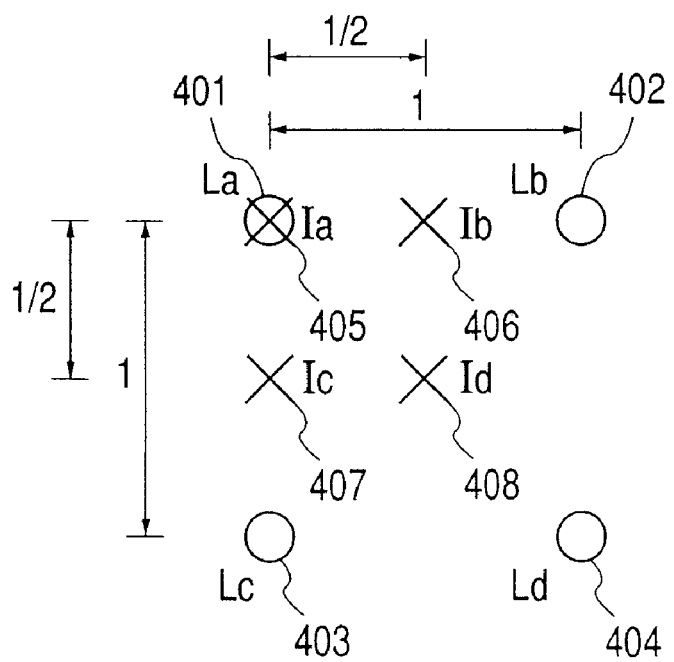
FIG. 4 is a drawing showing the interpolation process of intensity values for block matching with half pixel accuracy.

As described in the "Related Art" section, ¼ pixel accuracy motion vectors obtained by halving the ½ pixel accuracy motion vectors are rounded to ½ pixel accuracy in H.263. However by adding certain changes to this method, the absolute expectation value for rounding errors can be reduced. In H.263 that was mentioned in the related art, a value which is half the horizontal or vertical components of the motion vector for the luminance plane is expressed as r+s/4 (r is an integer, s is an integer less than 4 and not smaller than 0), and when s is 1 or 3, a rounding operation is performed to obtain a 2. This operation can be changed as follows: When s is 1, a rounding operation is performed to obtain a zero "0", and when s is 3 a 1 is be added to r to make s a "0". By performing these operations, the number of times that the intensity values at positions 406-408 in FIG. 4 is definitely reduced (probability that horizontal and vertical components of motion vector will be an integer become high) so that the absolute expectation value for the rounding error becomes small. However, even if the size of the error occurring in this method can be limited, the accumulation of errors cannot be completely prevented.

(v) The invention described in this specification is applicable to a method that obtains the final interframe prediction image by averaging the prediction images obtained by different motion compensation methods. For example, in the method described in Japanese Patent Application No. 8-3616 published as Japanese Patent Application Laid-Open No. 9-200763, interframe prediction images obtained by the following two methods are averaged: block matching in which a motion vector is assigned to each 16×16 pixel block; and block matching in which a motion vector is assigned to each 8×8 pixel blocks. In this method, rounding is also performed when calculating the average of the two prediction images. When only positive rounding is continuously performed in this averaging operation, a new type of rounding error accumulates. This problem can be solved by using multiple rounding methods for this averaging operation. In this method, negative rounding is performed in the averaging operation when positive rounding is performed in block matching. Conversely, positive rounding is used for the averaging when negative rounding is used for block matching. By using different rounding methods for averaging and block matching, the rounding errors from two different sources is cancelled within the same frame.

(vi) When utilizing a method that alternately locates P+ frames and P− frames along the time axis, the encoder or the decoder needs to determine whether the currently processed P frame is a P+ frame or a P− frame. The following is an example of such identification method: A counter counts the number of P frames after the most recently coded or decoded I frame, and the current P frame is a P+ frame when the number is odd, and a P− frame when the number is even (this method is referred to as an implicit scheme). There is also a method for instance, that writes into the header section of the coded image information, information to identify whether the currently coded P frame at the encoder is a P+ frame or a P− frame (this method is referred to as an explicit scheme). Compared with the implicit method, this method is well able to withstand transmission errors, since there is no need to count the number of P frames.

Additionally, the explicit method has the following advantages: As described in the "Related Art" section, past encoding standards (such as MPEG-1 or MPEG-2) use only positive rounding for motion compensation. This means for instance that the motion estimation/motion compensation devices (for example equivalent to 106 in FIG. 1) for MPEG-1/MPEG-2 on the market are not compatible with coding methods that use both P+ frames and P− frames. It is assumed that there is a decoder which can decode bit streams generated by a coding method that uses P+ frames and P− frames. In this case if the decoder is based on the above mentioned implicit method, then it will be difficult to develop an encoder that generates bit streams that can be correctly decoded by the above mentioned decoder, using the above mentioned motion estimation/compensation device for MPEG-1/MPEG-2.

However, if the decoder is based on the above mentioned explicit method, this problem can be solved. An encoder using an MPEG-1/MPEG-2motion estimation/motion compensation device can continuously send P+ frames, by continuously writing rounding method distinction information indicating positive rounding into the frame information header. When this is performed, a decoder based on the explicit method can correctly decode the bit stream generated by this encoder. Of course, it should be more likely in such case that the accumulation of rounding errors occurs, since only P+ frames are present. However, error accumulation is not a serious problem in cases where the encoder uses only small values as the quantization step size for the DCT coefficients (an example for such coders is a custom encoder used only for high rate coding). In addition to this interoperability between past standards, the explicit method further have the following advantages: (a) the equipment cost for high rate custom encoders and coders not prone to rounding error accumulation due to frequent insertion of I frames can be reduced by installing only positive or negative rounding as the pixel value rounding method for motion compensation; and (b) the above encoders not prone to rounding error accumulation have the advantage in that there is no need to decide whether to code the current frame as a P+ or P− frame, and the processing is simplified.

(vii) The invention described in this specification is applicable to coding and decoding methods that applies filtering accompanying rounding to the interframe prediction images. For instance, in the international standard H.261 for image sequence coding, a low-pass filter (called a "loop filter") is applied to block signals whose motion vectors are not zero (0) in interframe prediction images. Also, in H.263, filters can be used to smooth out discontinuities on block boundaries (blocking artifacts). All of these filters perform weighted averaging to pixel intensity values and rounding is then performed on the averaged intensity values. Even for these cases, selective use of positive rounding and negative rounding is effective for preventing error accumulation.

(viii) Besides I P+ P− P+ P− . . . , various methods for mixing P+ frames and P− frames such as I P+ P+ P− P− P+ P+ . . . , or I P+ P− P− P+ P+ . . . are applicable to the method of this invention. For instance, using a random number generator that outputs 0 and 1 both at a probability of 50 percent, the encoder can code a P+ and P− frame when the output is 0 and 1, respectively. In any case, the less the difference in probability that P+ frames and P− frames occur in a certain period of time, the less the rounding error accumulation is prone to occur. Further, when the encoder, is allowed to mix P+ frames and P− frames by an arbitrary method, the encoder and decoder must operate based on the explicit method and not with the implicit method described above. Accordingly, the explicit method is superior when viewed from the perspective of allowing flexibility configuration for the encoder and decoder.

(ix) The invention described in this specification does not limit the pixel value interpolation method to bilinear interpolation. Interpolation methods for intensity values can generally be described by the following equation:

[Equation 5]

$$R(x+r, y+s) = T\left(\sum_{j=-x}^{x} \sum_{j=-x}^{x} h(r-j, s-k)R(x+j, y+k)\right) \quad (5)$$

where, r and s are real numbers, h(r, s) is a function for interpolating the real numbers, and T(z) is a function for rounding the real number z. The definitions of R (x, y), x, and y are the same as in Equation 4.

Motion compensation utilizing positive rounding is performed when T (z) is a function representing positive rounding, and motion compensation utilizing negative rounding is performed when the function representing negative rounding. This invention is applicable to interpolation methods that can be described using Equation 5. For instance, bilinear interpolation can be described by defining h(r, s) as shown below.

[Equation 6]

$$h(r, s) = (1 - |r|)(1 - |s|), \quad 0 \le |r| \le 1, 0 \le |s| \le 1, \quad (6)$$
$$0, \quad \text{otherwise.}$$

However, if for instance h(r,s) is defined as shown below,

[Equation 7]

$$h(r, s) = 1 - |r| - |s|, \quad 0 \le |r| + |s| \le 1, rs < 0, \quad (7)$$
$$1 - |r|, \quad |r| \ge |s|, |r| \le 1, rs \ge 0,$$
$$1 - |s|, \quad |s| > |r|, |s| \le 1, rs > 0,$$
$$0, \quad \text{otherwise.}$$

then an interpolation method different from bilinear interpolation is implemented but the invention is still applicable.

(x) The invention described in this specification does not limit the coding method for error images to DCT (discrete cosine transform). For instance, wavelet transform (for example, N. Antonioni, et. al, "Image Coding Using Wavelet Transform" IEEE Trans. Image Processing, vol. 1, no. 2, April 1992) and Walsh-Hadamard transform (for example, A. N. Netravalli and B. G. Haskell, "Digital Pictures", Plenum Press, 1998) are also applicable to this invention.

What is claimed is:

1. An image decoding method comprising the steps of:

receiving an encode bitstream including information of I and P frames; and executing motion compensation by synthesizing a predicted image of a current frame using motion vector information included in the encoded bitstream and a reference image which is a previously decoded image, wherein said motion compensation includes calculating intensity values at points where no pixels actually exist in the reference image by interpolation, wherein said interpolation is done according to information specifying a positive rounding method or a negative rounding method included in a header section of the encoded bitstream of the current frame, when the current frame is a P frame, and wherein information specifying a positive rounding method or a negative rounding method is not received from the encoded bitstream of the current frame when the current frame is an I frame.

* * * * *

UNITED STATES PATENT AND TRADEMARK OFFICE
CERTIFICATE OF CORRECTION

PATENT NO. : 7,426,307 B2
APPLICATION NO. : 11/770953
DATED : September 16, 2008
INVENTOR(S) : Nakaya et al.

Page 1 of 1

It is certified that error appears in the above-identified patent and that said Letters Patent is hereby corrected as shown below:

Title page, Item (45), please add --*-- before the date Sep. 16, 2008.

Title page Item (*) Notice: please add the following insertion after Subject to any...

--This patent is subject to a terminal disclaimer.--

Signed and Sealed this

Twenty-fourth Day of February, 2009

JOHN DOLL
*Acting Director of the United States Patent and Trademark Office*